E. B. ALLEN.
CAR TRUCK.
APPLICATION FILED FEB. 23, 1909.

929,267.

Patented July 27, 1909.
2 SHEETS—SHEET 1.

WITNESSES:
A. A. Krieger
K. R. Smith

INVENTOR:
Ernest B. Allen
BY Robert R. Miller
ATTORNEY.

E. B. ALLEN.
CAR TRUCK.
APPLICATION FILED FEB. 23, 1909.

929,267.

Patented July 27, 1909.
2 SHEETS—SHEET 2.

WITNESSES:
A. A. Krieger
R. R. Smith

INVENTOR:
Ernest B. Allen
BY Robert N. Miller
ATTORNEY.

UNITED STATES PATENT OFFICE.

ERNEST BERNARD ALLEN, OF LOUISVILLE, KENTUCKY.

CAR-TRUCK.

No. 929,267.　　　　Specification of Letters Patent.　　　Patented July 27, 1909.

Application filed February 23, 1909. Serial No. 479,622.

*To all whom it may concern:*

Be it known that I, ERNEST BERNARD ALLEN, a citizen of the United States, residing at Louisville, in the county of Jefferson and State of Kentucky, have invented new and useful Improvements in Trucks for Heavy Vehicles, such as Street and Railway Cars and Automobiles.

My invention relates to improvements in four-wheel trucks wherein equalizing bars are used to lessen jar to the car-body due to irregularities in the track or road-bed, and the objects of my improvement are to provide a system of equalizing bars so designed, and so placed in relation to the other parts of the truck, as to very greatly diminish the jar to the car-body when the wheel encounters an irregularity, and also to prevent undue and unnecessary strain and jolt to the main portion of the truck.

A further object is to render the whole truck free from oscillation, and so to increase its flexibility that danger of its leaving the track is diminished.

The invention is equally suitable for use with single- or double-truck cars.

I attain the objects enumerated by the mechanism illustrated in the accompanying drawings, in which similar letters and numbers refer to similar parts throughout the several views. The said drawings illustrate the application of my invention to railway trucks for double-truck cars.

Figure 1:
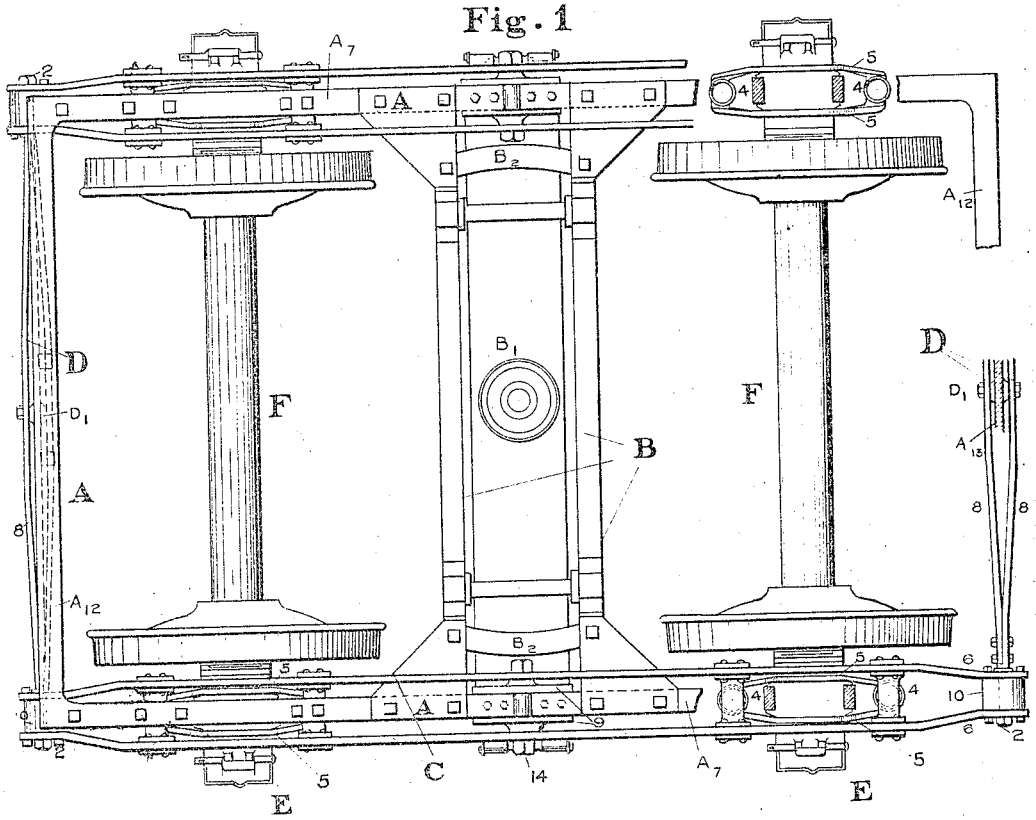
Figure 2:
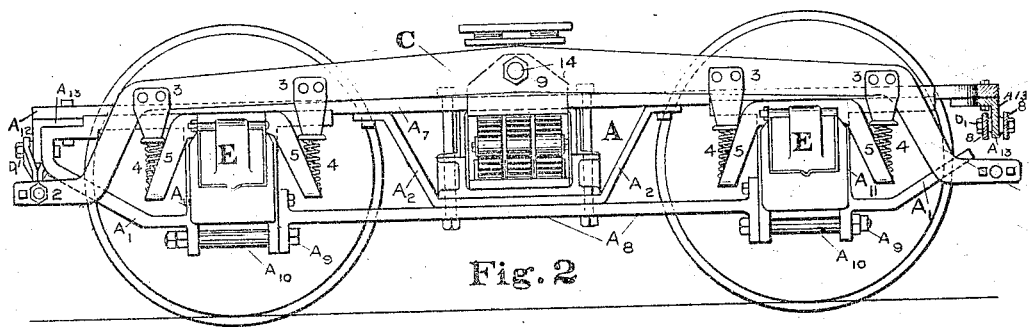
Figure 3:
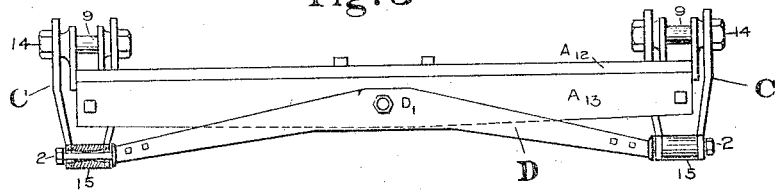
Figure 4:
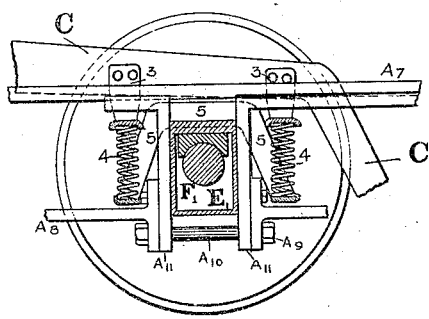

Figure 1 is a top view of my improved truck, having portions of the main truck frame and of the equalizing system cut away to show underlying parts. Fig. 2 is a side view or elevation of my improved truck, the right-hand end of the rigid truck frame being cut away in part to show a section of the transverse portion of the said frame, and the transverse equalizing lever at that end being removed. Fig. 3 is a view of the end portions of the truck, the parts behind being omitted for simplicity. A portion of the bearing or connection between the side and the transverse equalizing member is shown cut away at the left, to show construction. Fig. 4 is a section of the parts about one of the forward axles, being a section in the plane of the outer line of the side-bar $A_7$.

A is a frame forming the principal rigid truck frame, and consists of longitudinal upper side-bars $A_7$ and lower longitudinal side-bars $A_8$, braces $A_1$ at the ends between said bars, braces $A_2$ near their centers, pedestals or guides $A_{11}$ rigidly attached to said bars and braces, and reinforced thereby, the said pedestals forming guides for the journal-boxes; the side portions of the said rigid frame being connected front and back by rigid bars $A_{12}$, in the present construction reinforced by the angle-irons $A_{13}$, and further connected by the transom at the center, supporting the bolster B. The said bolster B is provided with springs adapted to the weight to be supported, and supports the weight of one end of the car-body, at the pivot $B_1$, and at the side-bearings $B_2$. Practically any form of bolster and truck frame may be used, if transverse end bars are provided, and pedestals permitting the journal-boxes to slide therein. In the construction shown, the pedestals $A_{11}$ are reinforced and held in place by the bolt $A_9$ joining the lower flanges, which are held apart by a sleeve $A_{10}$. The axles of the wheels F turn in journal-boxes E of standard type, which are freely slidable in the guides or pedestals $A_{11}$, and on which rest the yokes supporting the equalizers described below.

On each side of the upper longitudinal bars of the rigid truck frame is fixed a suitable casting, here shown of U-section, the two vertical flanges of which form the support and pivot for a side or longitudinal equalizing member C, composed of two bars rigidly connected, straddling the upper longitudinal bar $A_7$ of the rigid frame, and extending the length of said side-bar. The longitudinal equalizing member C is provided toward each end with two chairs 3, fixed to said member one on each side of each journal-box. A yoke 5 is provided for each journal-box, here constructed of two flat members resting front and back on the top of the journal-box, and bent downward at each end, where the front and back portions are connected by a cross-piece. These cross-pieces, one on each side of the journal-box, join the ends of the component members of the yoke 5, and support vertical compression-springs 4, the said springs being attached at their other ends to the chairs 3, and bearing against same. By the construction here described, the weight of such portion of the car-body as is borne by one truck is supported on the rigid frame A, and being transmitted thereby to the side equalizing members C, is transmitted through same to the chairs 3, and through each pair of said chairs, to the yokes 5 resting on the journal-boxes.

At the front and rear ends of the truck are provided transverse equalizing members D, each formed in this construction of two component bars 8, and pivoted at the center to the transverse bar $A_{13}$ of the rigid frame A. As here constructed, the bars $A_{13}$ are of angle iron, and the pivot bolt $D_1$ is run through the vertical leg of the angle, which is straddled by the two bars 8 of the transverse equalizing members D. The extremities of the transverse equalizing members D engage the extremities of the longitudinal equalizing members C in some substantial manner permitting freedom of movement without binding. As here constructed, the transverse equalizing members D terminate at each end in a cylindrical axle-like portion which passes through the adjacent ends of the side equalizing bars C, being provided with a shoulder preventing its extending too far into said ends, and a nut 2 outside at the extremities, preventing its withdrawal. The component bars of the members C are held apart at each end by a filler or bearing 15, held in position by bolts passing through it and the bar-ends, and a hole is drilled through the bar-ends and the filler between, to receive the axle-like ends of the transverse members D. This bearing is so formed or drilled as to fit snugly at the center, the cross-section enlarging toward the outer ends. As the bar which moves therein is of uniform cross-section, this construction permits limited movement of the equalizing members without binding. Where the movement is greater, a more flexible connection may be used. The filler or bearing is readily removable when worn, and easily replaced. The axle-like end of the transverse member D may be a separate piece bolted to the other portion, so that it may when worn be replaced without renewing or even removing the whole member.

When an inequality in the track, or an obstruction thereon, suddenly forces one of the wheels upward, or when the wheel suddenly drops, the tendency in the truck of ordinary construction is to strain severely the whole of the rigid frame. The sudden force applied at one corner tends to distort the rigid frame and to loosen the bolts and rivets which hold it together, as well as to render its material brittle through crystallization. Such sudden stresses also tend to jolt the car-body above. As explained below, the invention herein described diminishes the strain on the axles, makes the truck more easily adjustable to curves. It permits each wheel to adjust itself instantly to inequalities in the track to a degree impossible where the truck frame is supported at points at or near the journal-boxes, and without the interposition of an equalizing frame between the journal boxes and the rigid truck. The operation is as follows: If a local inequality forces the right front wheel upward, the box E of that journal is raised, sliding freely in the guides $A_{11}$ and the longitudinal equalizing member C on that side is raised at that end. The other end of this member at the same time tends to compress the two springs at the rear, which share the stock. Whatever upward thrust reaches the rigid frame and through it the car-body, is transmitted through the pivots. Since the adjacent pivot 14, which in the case supposed receives most of that thrust, is directly under the principal point of load, tendency to twist the rigid frame is minimized. It will further be evident that the transverse lever adjacent to the jolted wheel will transmit a part of the motion and shock to the other side of the truck; as will also the far transverse lever, which latter will tend to lighten the load on the wheel diagonally opposite to the jolted one. The system of levers thus gains for each wheel the sum of the resilience of all eight of the springs 4, and permits the motion to be taken up in the movement of the levers with greatly diminished vertical displacement of the pivots and the rigid truck. The transverse levers also operate to prevent pitching of the truck when going over rough track, or when acted on by the brakes or the torque of the motor.

In ordinary motor-driven trucks, the weight of the motors near the center line of the truck tends to distort the entire truck-frame, throwing the sides of the truck, containing the guides, out of vertical, and causing the boxes to bind. When the device described herein is applied to motor-driven trucks, the weight of the motor is to a large extent carried by the transverse equalizing bar, supported on each end by the side equalizing bar. This distributes the weight of the motor, prevents sagging, and permits the transverse portion of the truck-frame to be of lighter material. When a wheel drops into a depression, a reverse operation takes up the motion, and distributes the shock.

The invention may be applied to vehicles in which the wheels turn on non-revolving axles, by adapting the guides on the rigid frame to restrain the axles in vertical motion; the equalizing system being supported on the axles.

I am aware that trucks have been made in which equalizing frames of certain forms have been employed, but

I claim as new and desire to protect by Letters Patent, the following:

1. In a truck, means for diminishing jar and strain to the rigid truck frame, embodying an equalizing frame interposed between said rigid truck frame and the car axles and boxes, the said equalizing frame being supported by the axles and journal-boxes, and pivoted to the rigid truck frame at four points, to wit, midway between the wheels at each end and each side of said rigid truck.

2. In a truck, the combination of a main rigid frame carrying guides for the journal-boxes or axles, and a supplementary equalizing frame, supported by resilient means interposed between it and the journal-boxes and axles, the said equalizing frame consisting of side members pivoted intermediately between the wheels to the side members of the rigid frame, and transverse members fulcrumed on axes at right angles to the pivotal connection at the sides of the truck.

3. In a truck, a main rigid frame designed, with interposed resilient means, to support the load to be carried, and a supplementary equalizing frame, supported by springs interposed between it and the journal boxes or axles, and consisting of side members straddling the side-members of the rigid frame, pivoted thereto midway between the wheels, and transverse members fulcrumed on axes at right angles to the axes on which the side members turn.

4. In a truck, the combination with the axles and journal-boxes in which their extremities turn, of means for guiding the said axles and appurtenances in vertical motion, an equalizing system composed of four levers connected at their extremities, one on each side of the truck, the other two transverse, each lever being pivotally connected intermediately between said end connections to the rigid truck frame bearing the load to be supported, and means for supporting said equalizing system on the axles.

5. In a truck, a rigid frame adapted to support, with interposed resilient means, the load to be carried, a supplementary equalizing frame consisting of a pair of side-bars pivoted to the rigid frame between the wheels, and designed to transmit the whole weight, through interposed resilient parts, to journal-boxes sliding in guides, and pair of transverse equalizing bars engaging the ends of the above-mentioned side-bars, and pivoted to the rigid frame at the centers of said transverse bars.

6. In a truck, a supplementary frame for transmitting running strains from the axles to the rigid frame supporting the car-body, consisting of a pair of end equalizing bars pivoted on axes at right angles to the axles, side equalizing bars joining the extremities of said transverse bars, and pivoted to the rigid frame midway between the wheels, chairs attached to each side-equalizing bar front and back of each journal-box, a yoke designed to rest on each journal-box, and springs interposed between the extremities of said yokes, and the said chairs.

7. In a truck, a rigid truck frame, a pair of transverse equalizing members terminating at each end in a shoulder and an axle-like rod projecting beyond same, a pair of longitudinal equalizing members, pivoted to the rigid truck on each side of same midway between the wheels and having at each extremity a transverse boring adapted to receive the axle-like extremity of the adjacent transverse member, nuts adapted to restrain said extremities in said borings, and means for supporting each longitudinal equalizing member on the journal-boxes and axles of its own side.

8. In a truck, a rigid truck-frame designed to carry the load to be supported, and provided with guides in which the journal boxes are vertically slidable, and a pair of side-levers pivoted to the rigid frame, one on each side, midway between the wheels, each side-lever composed of two members rigidly connected, straddling the side member of the rigid frame, yokes each designed to rest on the top of a journal-box, and to support a spring on each side of the journal-box, and chairs attached to the side-levers, one on each side of each journal-box, the said chairs being adapted to carry the said springs.

9. In a truck, a rigid frame carrying guides in which the journal-boxes and axles are vertically slidable, and an equalizing system composed of longitudinal and transverse levers, the longitudinal levers being pivoted to the rigid frame at the sides thereof midway between the wheels, and the transverse levers of said equalizing system being pivoted to the transverse members of the rigid frame.

10. In a truck, a rigid frame supporting the car-body, a quadrilateral equalizing frame of four members each flexibly connected at its ends to the adjacent members, the said four members having pivots at their centers designed to support the rigid frame aforesaid, and means for supporting the said equalizing frame on the axles.

ERNEST BERNARD ALLEN.

Witnesses:
 EVA COOPER,
 WALTER S. MENDEL.